United States Patent

[11] 3,626,006

[72] Inventor Walter Stamm
 Tarrytown, N.Y.
[21] Appl. No. 773,636
[22] Filed Nov. 5, 1968
[45] Patented Dec. 7, 1971
[73] Assignee Stauffer Chemical Company
 New York, N.Y.

[54] THIOLANHYDRIDE OF 3-AMINOCROTONIC ACID
 1 Claim, No Drawings
[52] U.S. Cl. .................................................. 260/545 R,
 260/45.7 SU, 260/45.9 R
[51] Int. Cl. .................................................. C07c 153/00
[50] Field of Search .................................. 260/545,
 455 C

[56] References Cited
 UNITED STATES PATENTS
3,466,307 9/1969 Stamm et al. ................ 260/399

FOREIGN PATENTS
1,077,208 7/1967 Great Britain ............... 260/482

*Primary Examiner*—Lewis Gotts
*Assistant Examiner*—Robert Gerstl
*Attorneys*—Robert C. Sullivan, Donald M. MacKay, Paul J. Juettner, Daniel C. Block, Martin Goldwasser and Wayne C. Jaeschke ABSTRACT: Vinyl polymer compositions are stabilized against degradation and discoloration due to heat by adding to the polymer a stabilizing amount of a novel compound of the formula:

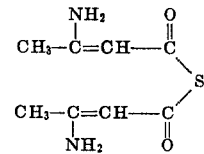

THIOLANHYDRIDE OF 3-AMINOCROTONIC ACID

BACKGROUND OF THE INVENTION

The present invention relates to a new thiolanhydride of 3-aminocrotonic acid and to vinyl polymer compositions having incorporated therein this new thiolanhydride compound to impart heat stability to the polymer composition.

SUMMARY OF THE INVENTION

According to the present invention there is provided a novel compound of the formula:

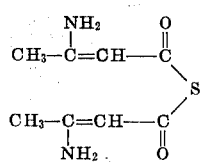

and heat stable compositions comprising the novel compound and vinyl polymers.

The present invention provides a novel compound which is found to be particularly effective in heat stabilizing vinyl polymers such as the polyvinyl halides, polyvinylidene halides, polyethylene, chlorinated polyethylenes, polypropylene, acrylonitrile-butadiene-styrene compositions, copolymers made from monomers of which at least one is a halogen containing monomer and post-chlorinated polymers.

DETAILED DESCRIPTION OF THE INVENTION

The term vinyl polymer as used herein denotes those solid homopolymers, copolymers, terpolymers and post-chlorinated polymers which require heat stabilization made from ethylenically unsaturated monomers by an addition polymerization reaction.

Included within the definition of ethylenically unsaturated materials useful in the preparation of polymers suitable for the practice of the present invention are the vinyl halide monomers of the formula:

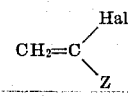

wherein Z can be selected from halogen or hydrogen and Hal is halogen, for example, vinyl chloride, vinyl bromide, vinylidene chloride and the like; mono-olefinic hydrocarbons such as ethylene and propylene; styrene and its nuclear, alpha-alkyl or aryl substituted derivatives such as p-methyl or butyl styrene; alpha-methyl or propyl styrene; phenyl styrene and halogenated styrenes such as alpha-chlorostyrene; mono-olefinically unsaturated esters including vinyl esters, e.g., vinyl acetate, vinyl stearate and vinyl benzoate; alkyl methacrylates, e.g., methyl and propyl methacrylate; alkyl crotonates; alkyl acrylates, e.g., methyl acrylate, hydroxy ethyl acrylate, and tertiary butylamino acrylate; isopropenyl esters; isopropenyl halides, vinyl esters of halogenated acids; alkyl and methallyl esters; esters of alkenyl alcohols; haloalkyl acrylates; alkyl alpha-cyano acrylates; maleates, e.g., monomethyl maleate, diethyl maleate; fumarates, e.g., monoethyl fumarate and dimethyl fumarate; diethyl glutaconate; mono-olefinically unsaturated organic nitriles such as fumaronitrile, acrylonitrile and methacrylonitrile; mono-olefinically unsaturated carboxylic acids such as cinnamic, maleic and fumaric and maleic anhydride and the like. Amides of these acids are also useful. Vinyl ethers and vinyl alkyl ethers, vinyl sulfides such as vinyl B-chloroethyl sulfide can also be utilized. Diolefinically unsaturated hydrocarbon containing two olefinic groups in conjugated relation and the halogenated derivatives such as butadiene-1,3 and 2 chloro-butadiene-1,3, can also be utilized.

The terms vinyl halide polymer, ethylene polymer and propylene polymer are used herein to denote homopolymers, copolymers, and terpolymers of the named monomer and suitably copolymerized monomers.

The novel thiolanhydride of the present invention can be prepared in good yields by reacting aminocrotonoyl chloride dissolved in an aprotic organic solvent with a small excess of a water solution of $Na_2S$ in the presence of triethylamine. The pH of the water solution is generally maintained at a pH in the range of 8–10. The reaction can be conducted at from about −5° C. to about 80° C. The aminocrotonic thiolanhydride can be recovered from the organic phase or from the water phase depending on the solubility of aminocrotonic thiolanhydride in the solvent chosen for the reaction. The reaction can be conducted at subatmospheric to superatmospheric pressure.

Aminocrotonoyl chloride can be prepared by reacting aminocrotonic acid and oxaloyl chloride in a suitable solvent at from −30° C. to about 80° C. preferably after protecting the amino group by reaction with dry HCl. The gases formed from the reaction are purged from the system with an inert gas such as dry nitrogen. The aminocrotonoyl chloride can be used in the preparation of the thiolanhydride without any further purification.

The proportion of the aminocrotonic thiolanhydride of the present invention which must be employed to make satisfactory heat stabilized compositions will vary over a wide range depending upon the particular vinyl polymer, the degree of stabilization needed, the end use of the resin, the presence of plasticizers and costabilizing additives, as well as the time and temperature requirements of the final processing. The presence of from about 0.01 to about 15 percent by weight of the compound of the present invention will be sufficient for most applications, although the preferred range is from about 0.5 to about 5.0 percent by weight of the compound of the present invention based on the weight of the polymeric resin.

Polyvinyl halides are preferably stabilized with from 0.1 to about 5.0 percent of the weight of polymer by the compound of the present invention. Polypropylene is preferably stabilized with from 0.05 to about 2 percent of the weight of polymer by the compound of the present invention.

The compound of the present invention can be advantageously employed in combination with costabilizing additives known in the art. The preferred costabilizing additives are the organic phosphites, dialkyl and diaryl phosphonates, zinc soaps, phenolic antioxidants, mercaptides, organotin compounds such as dialkyltin carboxylates or mercaptides, as well as polymeric alkylstannoic acids and alkylthiostannoic acids.

The compound of the present invention can be incorporated into the polymer composition by methods familiar to one skilled in the art for the addition of similar material to the polymer blends such as by mixing in a ribbon mixer or by the intensive mixing of a Henschel™ or Welex™ mixer.

The novel compound of the present invention can be prepared in accordance with procedures known in the art, as well as by the procedure of the following examples.

EXAMPLE 1

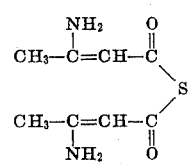

Step 1

Preparation of Aminocrotonoyl Chloride

To a 2 liter flask, equipped with a dry ice chilled condenser, a dropping funnel, a stirrer and a gas inlet tube, is added 55 grams (0.5 mole) of aminocrotonic acid and 400 cubic centimeters of ethyl ether. When the aminocrotonic acid has dissolved in the ether, the mixture is cooled to 0° C., the gas inlet tube is adjusted to pass beneath the surface of the liquid in the flask and 22 grams (0.6 mole) of anhydrous HCl slowly bubbled through the mixture. When the addition of HCl has been completed, a slow nitrogen purge started through the system. One hundred twenty seven grams (1 mole) of oxaloyl chloride is added dropwise to the mixture over a period of 2 hours. The reaction mixture is maintained at 0° C. during the addition of the oxaloyl chloride. After the addition of the oxaloyl chloride the reaction mixture is held at O° C. for an additional 8 hours with the nitrogen purge continuing through the system. The reaction mixture contains the aminocrotonoyl chloride.

Step 2

Preparation of Aminocrotonic Thiolanhydride

The reaction mixture prepared in the previous step is brought to room temperature. Some fresh ether and 10 grams of triethylamine are added to the mixture. A solution of 42 grams of $Na_2S$ (0.54 mole) in 200 cubic centimeters of water is prepared. The $Na_2S$ solution is slowly added to the reaction mixture and the system refluxed for 6 hours. The pH of the water phase is adjusted with $Na_2CO_3$ solution to maintain a pH of about 8–10. At the end of the 6 hours the two phases are separated and the aminocrotonic thiolanhydride recovered. The aminocrotonic thiolanhydride can be purified by recrystallization.

EXAMPLE 2

Compositions of the polymers set forth are prepared by mixing 3.0 percent by weight of compound of the present invention into the particulate polymer by a means suitable for the polymer being tested. After mixing, the stabilized composition is tested by conventional milling on a heated two roll mill to determine heat stability. The mill rolls are heated to a temperature sufficient to permit milling of the polymer and sufficiently high to degrade unstabilized polymer in 2 hours. Samples are taken from the mill every 10 minutes and evaluated. Unmilled samples are fluxed to form a homogenous composition and are aged at ambient temperatures. The stabilizer compound of this invention is found to provide enhanced stabilization to the polymers.

POLYMER

In the manner described above the compound of the present invention is evaluated successfully in the following systems:
1. Polyethylene (density 0.915)
2. Polyethylene (density 0.945)
3. Polypropylene
4. Polyvinyl chloride
5. Polyvinylidenechloride
6. Styrene-acrylonitrile-butadiene copolymer (ABS Type B)
7. Styrene-acrylonitrile-butadiene copolymer (ABS Type G)
8. Vinyl chloride-vinyl acetate copolymer
9. Vinyl chloride-acrylonitrile copolymer.

What is claimed:
1. A compound of the formula;

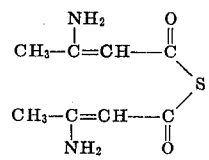

* * * * *